United States Patent
Chandrashekar et al.

(10) Patent No.: US 10,944,651 B2
(45) Date of Patent: Mar. 9, 2021

(54) MULTI-PROTOCOL CORRELATION FOR NETWORK SUBSCRIBER TROUBLESHOOTING

(71) Applicant: NetScout Systems Texas, LLC, Plano, TX (US)

(72) Inventors: Satishwar Chandrashekar, Bangalore (IN); Amreesh Agrawal, Bangalore (IN); Sarthak Barik, Bangalore (IN)

(73) Assignee: NetScout Systems Texas, LLC, Plano, TX (US)

( * ) Notice: Subject to any disclaimer, the term of this patent is extended or adjusted under 35 U.S.C. 154(b) by 142 days.

(21) Appl. No.: 16/129,009

(22) Filed: Sep. 12, 2018

(65) Prior Publication Data

US 2020/0084125 A1 Mar. 12, 2020

(51) Int. Cl.
*H04L 12/26* (2006.01)
*H04L 29/06* (2006.01)

(52) U.S. Cl.
CPC ............. *H04L 43/04* (2013.01); *H04L 43/12* (2013.01); *H04L 43/18* (2013.01); *H04L 65/1006* (2013.01); *H04L 65/1066* (2013.01)

(58) Field of Classification Search
CPC ..... H04L 43/04; H04L 43/12; H04L 65/1066; H04L 65/1006; H04L 43/18
See application file for complete search history.

(56) References Cited

U.S. PATENT DOCUMENTS

| | | | |
|---|---|---|---|
| 6,456,845 B1* | 9/2002 | Drum .................. | H04M 3/2254 455/403 |
| 7,254,109 B2* | 8/2007 | Verma ................. | H04L 41/0631 370/217 |
| 2011/0188397 A1* | 8/2011 | McCann ................. | H04L 43/00 370/252 |
| 2013/0279497 A1* | 10/2013 | Verma .................... | H04L 69/18 370/352 |
| 2015/0193786 A1* | 7/2015 | Costelloe ........... | G06Q 30/0201 705/7.29 |
| 2015/0327091 A1* | 11/2015 | Curtin ................... | H04W 24/08 370/250 |

* cited by examiner

*Primary Examiner* — Philip C Lee
(74) *Attorney, Agent, or Firm* — Locke Lord LLP; Scott D. Wofsy; Christopher J. Capelli

(57) ABSTRACT

A method for multi-protocol monitoring and correlation includes aggregating captured network performance data including a plurality of captured network performance metrics for a plurality of subscriber session records associated with a plurality of protocols. A first level of correlation is performed between the plurality of subscriber session records using one or more direct correlation rules. The correlated subscriber session records associated with the plurality of protocols are related to the same subscriber session. A second level of correlation is performed between the correlated subscriber session records using one or more indirect correlation rules based on the performed first level of correlation.

18 Claims, 5 Drawing Sheets

US 10,944,651 B2

MULTI-PROTOCOL CORRELATION FOR NETWORK SUBSCRIBER TROUBLESHOOTING

FIELD OF THE INVENTION

Embodiments of the present invention relate generally to network monitoring, and specifically to multi-protocol correlation for network subscriber troubleshooting.

BACKGROUND OF THE INVENTION

In the cellular network subscriber troubleshooting paradigm, it is imperative for a wireless network monitoring and troubleshooting solution to display information related to entire call trace representative of all subscriber activities, across protocols, across multiple legs of the entire cellular service provider network. To perform, for example, a Voice over LTE (VoLTE) call, the network activities typically include, but are not limited to radio management, session management, mobility management on the cellular network side and activities such as call set up and tear down on the Evolved Packet Core ("EPC") core network side for the VoLTE call. VoLTE is a service that enables users to make voice calls over a data network (i.e., Voice over IP (VoIP)). Fundamentally each of various aspects of subscriber communication establishment are happening over different protocol stacks, possibly exchanging different subscriber identification information and carrying different session defining attributes and all of them over different legs of the same call. The continuous evolution of cellular subscriber network brings in the challenges of newer protocols and interfaces to be correlated as part of a network monitoring/troubleshooting solution.

As an additional changing aspect in the network monitoring, the extent of the proprietary usage of protocols that can be made accessible over a network for use as per vendor/customer needs can be varied. The ability to customize or adapt to this evolution and vendor specific needs would be advantageous to any wireless network monitoring solution.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for multi-protocol monitoring and correlation includes aggregating captured network performance data including a plurality of captured network performance metrics for a plurality of subscriber session records associated with a plurality of protocols. A first level of correlation is performed between the plurality of subscriber session records using one or more direct correlation rules. The correlated subscriber session records associated with the plurality of protocols are related to the same subscriber session. A second level of correlation is performed between the correlated subscriber session records using one or more indirect correlation rules based on the performed first level of correlation.

In another aspect, a system for multi-protocol monitoring and correlation includes a processor and a memory device coupled to the processor. The memory device contains a set of instructions that, when executed by the processor, cause the processor to aggregate captured network performance data including a plurality of captured network performance metrics for a plurality of subscriber session records associated with a plurality of protocols. The set of instructions, when executed by the processor, further cause the processor to perform a first level of correlation between the plurality of subscriber session records using one or more direct correlation rules. The correlated subscriber session records associated with the plurality of protocols are related to the same subscriber session. The set of instructions, when executed by the processor, also cause the processor to perform a second level of correlation between the correlated subscriber session records using one or more indirect correlation rules based on the performed first level of correlation.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
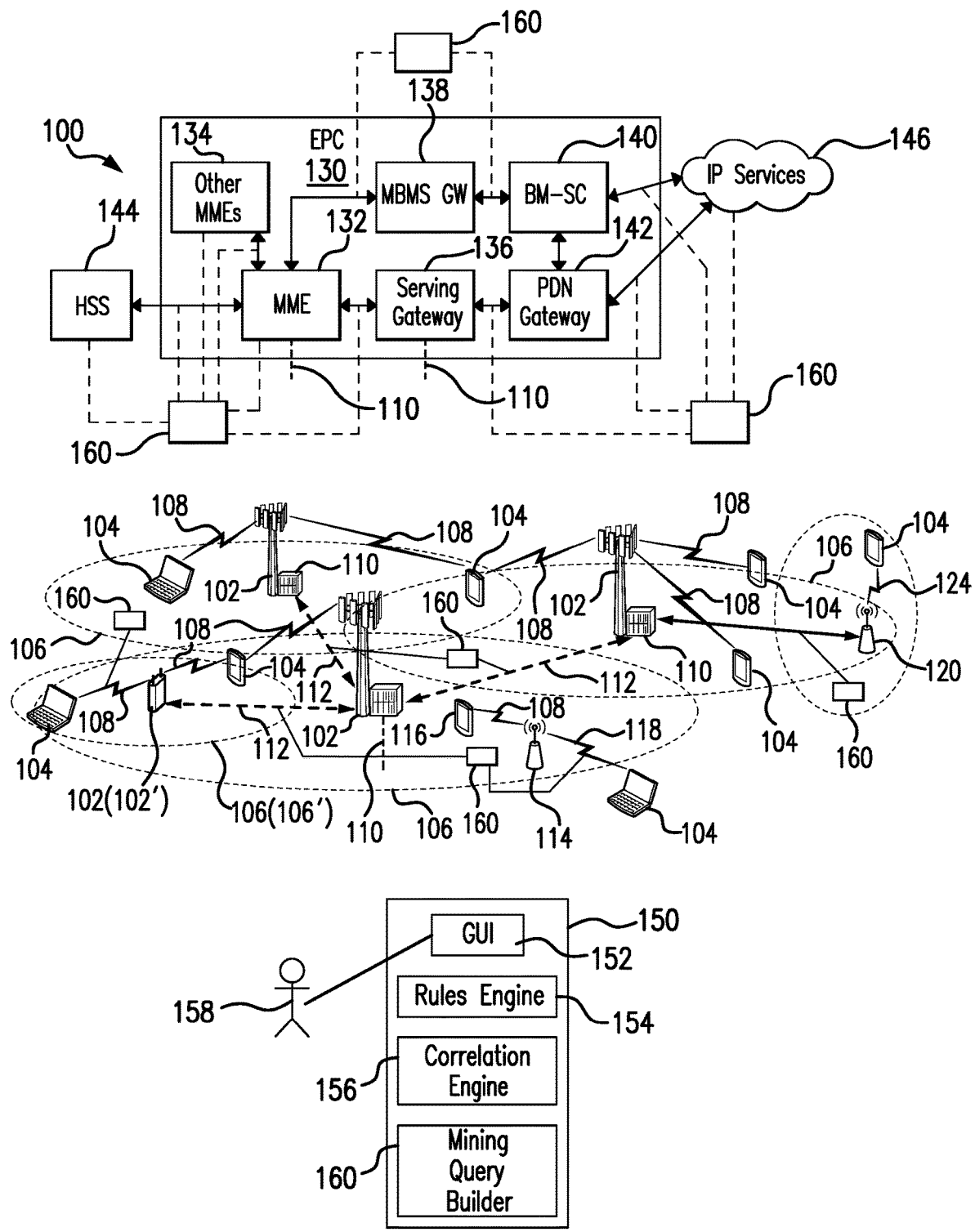
FIG. 1 illustrates an example communication network in accordance with an illustrated embodiment.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Several aspects of telecommunication systems will now be presented with reference to various apparatus and methods. These apparatus and methods will be described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various embodiments of the present invention disclose a network monitoring and troubleshooting solution that conducts a multi-protocol event correlation using a single trace. The complexity of multi-protocol correlation comes from the fact that different keys from different protocols need to be matched at different times as part of correlation function to determine that these keys are indeed associated with the same subscriber session. A session is also known as a call. A scenario where sessions are correlated based on keys and where all sessions are combined together falls into the category of shallow correlation. Advantageously, embodiments of the present invention also use more advanced method of correlation, where keys from a first protocol can be matched and correlated with keys of a second protocol, which in turn may be used to fetch other sessions back from the first protocol according to any desired method. However, the sessions that were retrieved for the first protocol are associated with the same call happening on the exemplary network and users typically would like to see them as a single combined session record. This single combined session record may be generated by utilizing deep correlation. In other words, embodiments of the present invention disclose a multi-level deep correlation wherein all unique child sessions are not just combined under an established parent session, but rather the unique child sessions themselves are also correlated and/or combined.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 130. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 130 through backhaul links 110 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 130) with each other over backhaul links 112 (e.g., X2 interface). The backhaul links 112 may be wired or wireless.

The base stations 102 may wirelessly communicate with the UEs 104. Each of the base stations 102 may provide communication coverage for a respective geographic coverage area 106. There may be overlapping geographic coverage areas 106. For example, the small cell 102' may have a coverage area 106' that overlaps the coverage area 106 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 108 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 108 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 114 in communication with Wi-Fi stations (STAs) 116 via communication links 118 in a 5 GHz unlicensed frequency spectrum. When communicating in an unlicensed frequency spectrum, the STAs 116/AP 114 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 114. The small cell 102', employing NR in an unlicensed frequency spectrum, may boost coverage to and/or increase capacity of the access network.

The gNodeB (gNB) 120 may operate in millimeter wave (mmW) frequencies and/or near mmW frequencies in communication with the UE 104. When the gNB 120 operates in mmW or near mmW frequencies, the gNB 120 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 120 may utilize beamforming 124 with the UE 104 to compensate for the extremely high path loss and short range.

The EPC 130 may include a Mobility Management Entity (MME) 132, other MMEs 134, a Serving Gateway 136, a Multimedia Broadcast Multicast Service (MBMS) Gateway 138, a Broadcast Multicast Service Center (BM-SC) 140, and a Packet Data Network (PDN) Gateway 142. The MME 132 may be in communication with a Home Subscriber Server (HSS) 144. The MME 132 is the control node that processes the signaling between the UEs 104 and the EPC 130. Generally, the MME 132 provides bearer and connection management. All user Internet protocol (IP) packets are transferred through the Serving Gateway 136, which itself is connected to the PDN Gateway 142. The PDN Gateway 142 provides UE IP address allocation as well as other functions. The PDN Gateway 142 and the BM-SC 140 are connected to the IP Services 146. The IP Services 146 may include the Internet, an intranet, an IP Multimedia Subsystem (IMS), a PS Streaming Service (PSS), and/or other IP services. The BM-SC 140 may provide functions for MBMS user service provisioning and delivery. The BM-SC 140 may serve as an entry point for content provider MBMS transmission, may be used to authorize and initiate MBMS Bearer Services within a public land mobile network (PLMN), and may be used to schedule MBMS transmissions. The MBMS Gateway 138 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 130 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Advantageously, various embodiments of the present invention contemplate a monitoring and troubleshooting system that efficiently and accurately evaluates signaling, performance and configuration data of both EPC 130 and RAN to present accurate representation of various sessions as they happen in the network.

In the illustrated embodiment, a monitoring tool is implemented as a network probe 160. The network probe 160 may be configured as hardware, software, firmware, or combination thereof, for monitoring data transmission through a variety of network interfaces. Generally, the network probe 160 may be deployed at any of a variety of locations or links of the access network 100 to collect network data packets. The network probe 160 may be configured as a special purpose computing device or a software component (not limited to a single process) dedicated to monitoring data communicated via the access network 100. Alternatively, the network probe 160 may be a general purpose computing device with specialized software components installed thereon. In one embodiment, the network probe 160 is a nGenius InfiniStream, available from NetScout Systems, Inc. of Westford, Mass.

In this example, after collecting the packets (user plane and control plane), the network probe 160 selectively generates an Adaptive Service Intelligence (ASI) data set that can include key performance indicators and Adaptive Session Records ("ASRs") as described in U.S. patent application Ser. No. 12/756,638 entitled "Real-Time Adaptive Processing of Network Data Packets for Analysis" and filed on Apr. 8, 2010.

According to an embodiment of the present invention, a troubleshooting system 150 may include, but not limited to, a computer server operatively coupled to each segment of access network 100 and to an operations support systems (OSS) platform (interchangeably referred to herein as the "network management platform"). At the highest level, the network management platform provides the computer resources required to perform various network management functions, such as billing, customer care, network management, inventory control, maintenance, trouble ticket reporting, surveillance and service provisioning. In some embodiments, the network management platform comprises a plurality of applications, such as performance, fault, configuration and security management applications.

A session, call, or data record is created for each UE 104 using messages, signals, and/or data collected or intercepted by monitoring probes 160 from various network interfaces. A plurality of monitoring probes 160 may be coupled to interfaces and links in the access network 100 to passively monitor and collect signaling data from one or more interfaces in the network. The monitoring probes 160 may collect user plane and control plane data from the interfaces. The monitoring probes 160, may comprise, for example, one or more processors running one or more software applications that collect, correlate and analyze Protocol Data Units (PDU) and data packets from both RAN and EPC 130 network interfaces and links. All collected data may be stored in a database. Another example of signaling data collected from the access network 100 would be to obtain switching and routing table information or subscribers IP trace route information using well-known real time processing programs such as rtTrace.

As shown in FIG. 1, the troubleshooting system 150 may comprise, or otherwise may cooperate with a rules engine 154, correlation engine 156 and mining query builder 160. According to an embodiment of the present invention, various types of correlation rules may be applied using the rules engine software component 154, e.g., implemented by programming instructions encoded in one or more tangible, non-transitory computer-readable storage media executed by one or more processors of the troubleshooting system 150. According to embodiments of the present invention, these correlation rules managed by the rules engine 154 may feed the correlation engine 156. The correlation engine 156 may comprise program instructions stored on one or more computer-readable storage devices, which may include internal storage on the troubleshooting system 150. The correlation engine 156 performs multi-level, multi-protocol correlation as described below. Although the correlation engine 156 can perform these functions for shallow correlation, it is particularly advantageous for deep correlation. As an example of shallow correlation, the correlation engine 156 is configured and operable to group all protocols and all child sessions associated with the same subscriber session. As an example of deep correlation, the correlation engine 156 is configured and operable to perform correlation of all child sessions associated with the same subscriber session. The mining query builder 160 may comprise program instructions stored on one or more computer-readable storage devices, which may include internal storage on the troubleshooting system 150. The mining query builder 160 provides a very easy, yet comprehensive way to perform data mining and develop complex aggregations to obtain desired information out of a large data-set of aggregated network performance metrics. In an embodiment, the mining query builder 160 may also utilize a user interface to show a user a first-hand view of how the query looks and may give the user an option to edit it directly as well.

In other words, as noted above, the troubleshooting system 150 may include a user interface, such as graphical user interface (GUI) 152 program. In one embodiment, GUI 152 may comprise a framework for collecting user input from various users 158, such as subscriber identification information and a time period of interest for which records should be correlated. This obtained time period may be incorporated into the rules to provide more accurate correlation as described in more detail below.

Figure 2:
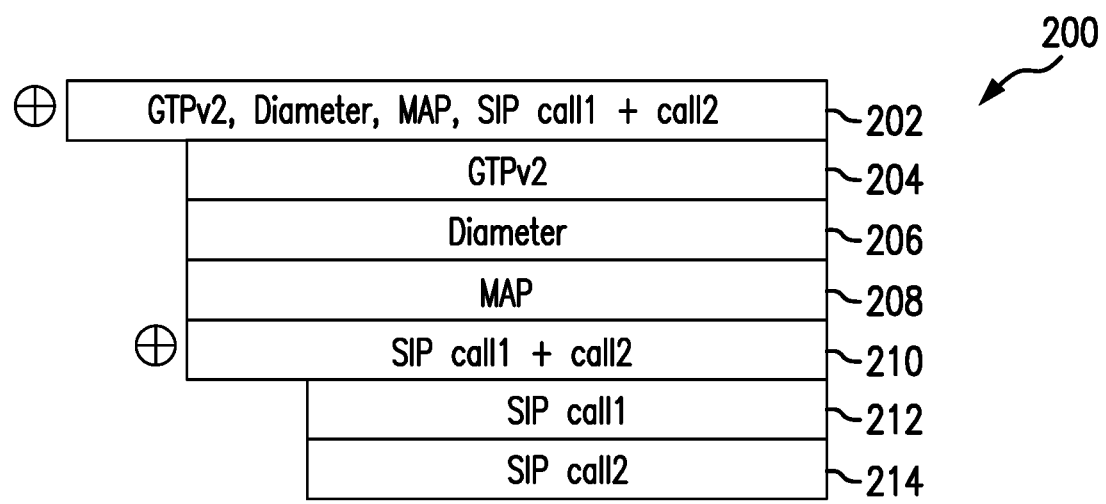
FIG. 2 illustrates example session records associated with a single VoLTE call obtained from different links in the communication network shown in FIG. 1.

FIG. 2 illustrates example session records associated with a single VoLTE call obtained from different links in the communication network shown in FIG. 1. The diagram 200 in FIG. 2 includes both correlated multimedia session records and individual multimedia session records established over a radio access network via a packet-switched access network, for example. More specifically, the diagram 200 represents a case where a subscriber makes a single VoLTE call and where GPRS Tunneling Protocol (GTPv2), Session Initiation Protocol (SIP), DIAMETER protocol and Mobile Application Part (MAP) are few examples of the many protocols involved across different legs of a VoLTE call. In FIG. 2, a component 202 represents a session record that includes GTPv2, DIAMETER, MAP and SIP information that may be used by the correlation engine 156. A component 204 represents relevant GTPv2 session record information associated with the subscriber's call that may be used by the correlation engine 156. A component 206 represents relevant DIAMETER session record information associated with the subscriber's call that may be used by the correlation engine 156. A component 208 represents relevant MAP session record information associated with the subscriber's call that may be used for correlation purposes.

In addition, there are three different components related to SIP protocol transactions in the diagram 200. SIP is defined by IETF (Internet Engineering Task Force) in RFC (Request for Comments) 3261 and has been developed to allow session control between peers. SIP is typically used for initiating/setting up and tearing down/terminating multimedia communication sessions, such as but not limited to, voice and video calls over an IP bearer such as that provided by the Internet. SIP is a derivative of the HTTP (Hypertext Transfer Protocol) system, which is ASCII (American Standard Code for Information Interchange) based. SIP is intended to support a superset of the call processing functions present in the PSTN (Public Switched Telephone Network). Thus, SIP can be used for operations, such as but not limited to, call setups, call terminations, call modifications and call transfers. These operations can also be collectively known as SIP operations. In FIG. 2, a component 212 represents relevant SIP first operation information associated with the subscriber's call. A component 214 represents relevant SIP second operation information associated with the same subscriber's call. Advantageously, a component 210 represents correlated SIP first operation information and SIP second operation information. In other words, the correlation engine 156 is configured and operable to correlate two or more relevant SIP operations that belong to the same VoLTE call across the access network.

Figure 3:
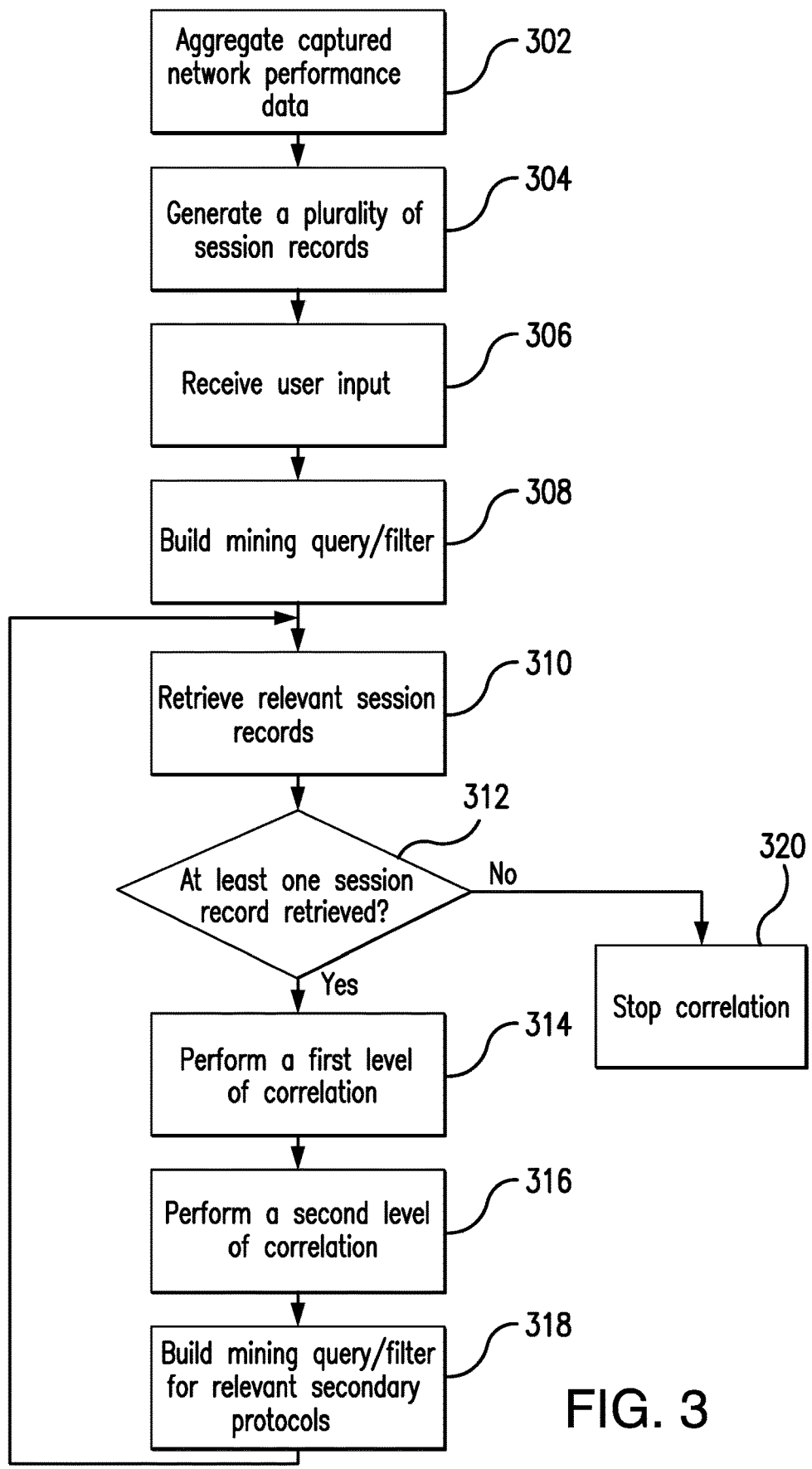
FIG. 3 is a flowchart illustrating operation of a embodiment of the present invention.

FIG. 3 is a flowchart illustrating operation of an embodiment of the present invention. Before turning to description of FIG. 3, it is noted that the flow diagram shown therein is described, by way of example, with reference to steps and/or elements shown in FIGS. 1 and 2 although these operational steps may be carried out in any system and are not limited to the scenario shown in the aforementioned figure. Additionally, the flow diagram in FIG. 3 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, at step 302, the plurality of network probes 160 captures a plurality of user plane packets and a plurality of control plane packets from the access network 100. Optionally, the plurality of network probes 160 can be deployed in the access network 100 so that media sessions can be evaluated end-to-end.

VoIP employs session control protocols to control the set-up and the tear-down of calls as well as audio-codecs which encode/decode the speech signal, thereby allowing the transmission of the speech over an IP network as digital audio through a stream of media packets.

VoIP services may be considered to consist of a signaling plane and a media plane. On the signaling plane various protocols describe the session (call) flow in terms of involved parties, intermediary VoIP entities (i.e. VoIP proxies, routers) and the characteristics of the VoIP service (call). The media plane typically carries the media information (e.g. audio and/or video data) between the involved parties. Neither the media plane nor the signaling plane alone is sufficient to carry a VoIP service.

VoIP has been implemented in various ways using both proprietary and open protocols and standards, such as, but not limited to: H.323, IP Multimedia System (IMS), Media Gateway Control Protocol (MGCP), Session Initiation Protocol (SIP), Real-time Transport Protocol (RTP), Session Description Protocol (SDP), Real Time Streaming Protocol (RTSP), Microsoft Media Services (MMS).

On the signaling plane, protocols like SIP (see IETF RFC 3261, "SIP: Session Initiation Protocol", available at http://www.ietf.org) or ITU-T recommendation H.323 (see H.323, "Packet-based multimedia communications systems", Edition 7, 2009, available at http://www.itu.int) are commonly used. With regard to the media plane, protocols like RTP (Real-time Transport Protocol, see IETF RFC 3550, "RTP: A Transport Protocol for Real-Time Applications", available at http://www.ietf.org), MSRP (see IETF RFC 4975, "The Message Session Relay Protocol (MSRP)", available at http://www.ietf.orq) or ITU recommendation T.38 (see T.38, "Procedures for real-time Group 3 facsimile communication over IP networks", Edition 5 (2007) or Edition 6 (2010), available at http://www.itu.int) are used. Other protocols for the media plane are RTSP (see Real Time Streaming Protocol), MMS (Microsoft Media Services protocol) or Real Audio PNM/PNA.

At step 304, the plurality of network probes 160 generates a full list of ASI metrics for the received signaling plane and media plane packets. The full list of ASI metrics may include some basic KPIs and ASRs for signaling plane and media plane traffic. In some embodiments, instead of generating the full list of ASI metrics for all signaling and/or media plane packets, the network probes 160 may be configured to generate a subset of ASI metrics that are relevant to a predefined list of identifiers indicating specific subscribers of interest.

At step 306, the correlation engine 156 employs a user interface (e.g., GUI module 152) to receive user input. User input may include, but is not limited to, subscriber identification information and/or time period of interest (date and time) for which records should be correlated.

Based on received user input, at step 308, the mining query builder 160 builds data mining query/filter to retrieve data relevant for information management and correlation from the plurality of network probes 160. In other words, the mining query builder 160 helps the correlation engine 156 (configured to perform correlation and data analytics) to identify and locate ASR data relevant for the protocols being searched. In one embodiment, the mining query builder 160 passes the generated query to the correlation engine 156. Further, at step 308, the correlation engine 156 sends the received query to the plurality of network probes 160 deployed in the access network 100.

According to an embodiment of the present invention, at step 310, the correlation engine 156 retrieves one or more relevant subscriber session records (ASR data) satisfying the generated query from the plurality of network probes 160. The correlation engine 156 is configured and operable to utilize the retrieved subscriber session records for correlation purposes. The retrieved subscriber session records may be associated with a plurality of protocols, such as, but not limited to H.323, IMS, MGCP, SIP, RTP, SDP, RTSP, MMS, MSRP, T.38, Real Audio PNM/PNA. Generally, the correlated session records may be associated with any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

At step 312, the correlation engine 156 performs a check to determine if at least one relevant subscriber session record has been retrieved.

In response to determining that at least one subscriber session record has been retrieved (decision block 312, "yes" branch), at step 314, the correlation engine 156 performs a first level of correlation in time between the retrieved plurality of subscriber session records using the rules engine 154. A correlation in time is performed between corresponding pairs of retrieved subscriber session records associated with a time period of interest specified by the user 158. In one embodiment, the first level of correlation represents shallow correlation. As an example of shallow correlation, the correlation engine 156 is configured and operable to group all protocols and all child sessions associated with the same subscriber session. Step 314 may be performed using one or more direct correlation rules. A direct correlation analysis is performed between the two primary protocols of the same or different type based on one or more direct correlation rules. According to an embodiment of the present invention, each of the one or more direct correlation rules identifies the type of the protocol to include in correlation analysis. Examples of primary protocols include, without limitations, GTP-v2c, SIP, Evolved Packet System (EPS) Session Management (ESM), S1AP, Diameter. Referring back to the example session records associated with a single VoLTE call shown in FIG. 2, correlation between GTPv2 and SIP protocols represents an example of direct correlation analysis. Table 1 below includes few examples of both direct and indirect correlation rules:

TABLE 1

| Correlation Type | Correlation Rule |
|---|---|
| Direct | begin<br>    correlate [GTP-v2c as lhs, SIP as rhs]<br>    where<br>        (lhs.msisdn=rhs.caller OR<br>        lhs.msisdn=rhs.callee) AND<br>        rhs lies within lhs [start_time, end_time]<br>end |
| Direct | begin<br>    correlate [GTP-v2c as lhs, Diameter as rhs]<br>    where<br>        lhs.imsi=rhs.private_user_name OR<br>        lhs.msisdn=rhs.public_user_name)<br>    AND |

TABLE 1-continued

| Correlation Type | Correlation Rule |
|---|---|
| Indirect | lhs lies within rhs [start_time, end_time]<br>end<br>link<br>begin<br>correlate [SIP as call 1, SIP as call2] using [MAP]<br>where<br>    call1.caller=call2.caller AND<br>    call1.callee=MAP.msisdn AND<br>    call2.callee=MAP.msrn AND<br>    call1 lies within call2 [start_time_1, end_time] AND<br>    MAP lies within SIP [start_time-1, end_time]<br>end |

The correlation engine 156 may utilize the first exemplary direct rule in Table 1 to perform correlation between VoLTE subscriber session records associated with GTPv2 and SIP protocols. The correlation engine 156 may utilize the second exemplary direct rule in Table 1 to perform correlation of session management protocols on S11 link with AAA protocol on any of the secondary links. According to an embodiment of the present invention, the "link" keyword utilized in any of the correlation rules enables the correlation engine 156 to correlate the same Diameter protocol parameters with multiple GTP subscriber session records, since the utilized Diameter protocol parameters are not specific to any subscriber sessions. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

An indirect correlation analysis is context dependent on a secondary protocol for the correlation of the two primary protocols based on one or more indirect correlation rules. According to an embodiment of the present invention, indirect correlation analysis may be utilized when analyzing additional signal flow information relating to handover procedures where temporary identities mappings are available as part of the secondary protocol. Examples of secondary protocols include, without limitations, MAP, CAMEL Application Part (CAP), SIP, Diameter. Referring back to the example of indirect correlation rule in Table 1, this indirect correlation rule enables correlation of two SIP subscriber session records (e.g., call1 and call2) using the MAP protocol. More specifically, the correlation engine 156 may utilize the exemplary indirect correlation rule in Table 1 to perform correlation of information relating to handover procedures where a VoLTE call switches from packet switch (PS) network to circuit switch (CS) network. The SIP call seen on the CS network uses a different temporary subscriber identity which is generated as part of MAP protocol. It should be noted that this indirect correlation rule enables the correlation engine 156 to perform deep correlation of SIP subscriber session records using MAP protocol's subscriber session records.

Referring back to FIG. 3, at step 316, after all the correlation rules associated with the shallow correlation are executed by the rules engine 154, the correlation engine 156 performs a second level of correlation between the retrieved plurality of session records. In one embodiment, the second level of correlation represents deep correlation. Step 316 may be performed using one or more indirect correlation rules. As one non-limiting example, at step 316, the correlation engine 156 correlates all child sessions associated with the same subscriber session per each protocol. At step 318, after all the correlation rules associated with the deep correlation are executed by the rules engine 154, the correlation engine 156 coordinates with the mining query builder 160 to generate a data mining query/filter for relevant secondary protocols based on the direct and/or indirect correlation rules and based on the relevant data retrieved at step 310 from the plurality of network probes 160. Next, the correlation engine 156 returns back to step 310 and repeats steps 310-318 until all relevant session records are processed (decision block 312, "No" branch), at which point the correlation analysis stops (step 320).

Figure 4:
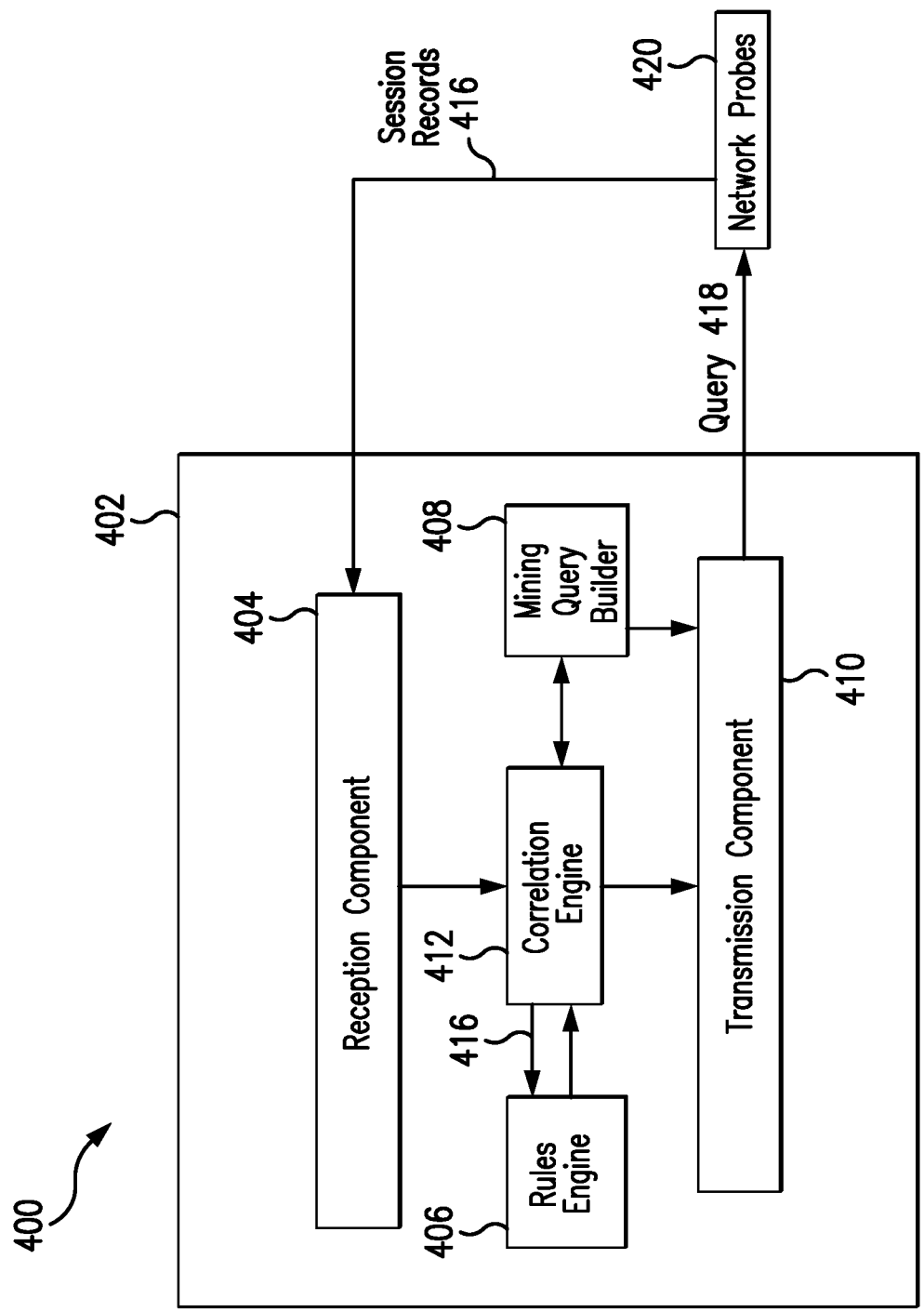
FIG. 4 is a conceptual data flow diagram illustrating the data flow between different components/means in an exemplary apparatus.

FIG. 4 is a conceptual data flow diagram illustrating the data flow between different components/means in an exemplary apparatus. The apparatus 402 may be the troubleshooting system 150 shown in FIG. 1. The apparatus 402 includes a reception component 404, a rules engine 406, a correlation engine 412, a mining query builder 408 and a transmission component 410. The reception component 404 may receive aggregated data, such as but not limited to session records 416, from a plurality of network probes 420 and the transmission component 410 may send mining queries 418 to the plurality of network probes 420.

In certain configurations, the rules engine 406 is pre-configured to maintain a plurality of correlation rules described above and configured to automatically identify from user input (subscriber identification information and/or time period of interest (date and time)) and/or from received session records, one or more predefined correlation rules that should be executed to obtain desired information. Although the foregoing examples illustrated specific implementations of specific rules associated with specific protocols, it will be appreciated that a virtually endless variety of specialized correlation rules associated with a variety of network protocols may be provided in accordance with embodiments of the present invention. Advantageously, these specialized rules may be written in a natural language.

As shown in Table 1 above, in certain configurations, syntax of the rules is very intuitive and somewhat akin to equations where the left hand side of a correlation rule is compared with the right hand side of the correlation rule. At least in some embodiments, the rules engine 406 may be pre-configured to eliminate one or more duplicate correlation rules if they exist. Generally, the rules engine 406 executes the correlation rules providing an ability to correlate two primary network protocols using a secondary/link network protocol.

In certain configurations, the correlation engine 412 is pre-configured to perform multi-level, multi-protocol correlation as described above. For example, the correlation engine 412 may be configured to perform both shallow and deep correlation. In other words, the correlation engine 412 is pre-configured and operable to perform correlation of all child sessions associated with the same subscriber session.

As noted above, in certain configurations, the correlation engine 412 may also be pre-configured to enable correlation of proprietary vendor specific network protocols. For example, the correlation engine 412 may be pre-configured to receive user input, aggregate a plurality of session records relevant to the received input, send the aggregated plurality of session records 416 to the rules engine 406 and process results of deep and/or shallow correlation to present more accurate representation of the call sessions as they happen in the access network.

In certain configurations, the correlation engine 412 uses the mining query builder 408 to perform data mining and develop complex aggregations to obtain desired information out of a large data-set of aggregated network performance metrics. Additionally, the mining query builder 160 may also utilize a user interface to show a user a first-hand view of how the data mining query 418 looks and may give the user an option to edit it directly as well. In various configurations the mining query builder 408 may be capable of communicating with a plurality of network probes, by sending the generated queries 418 via the transmission component 410.

Figure 5:
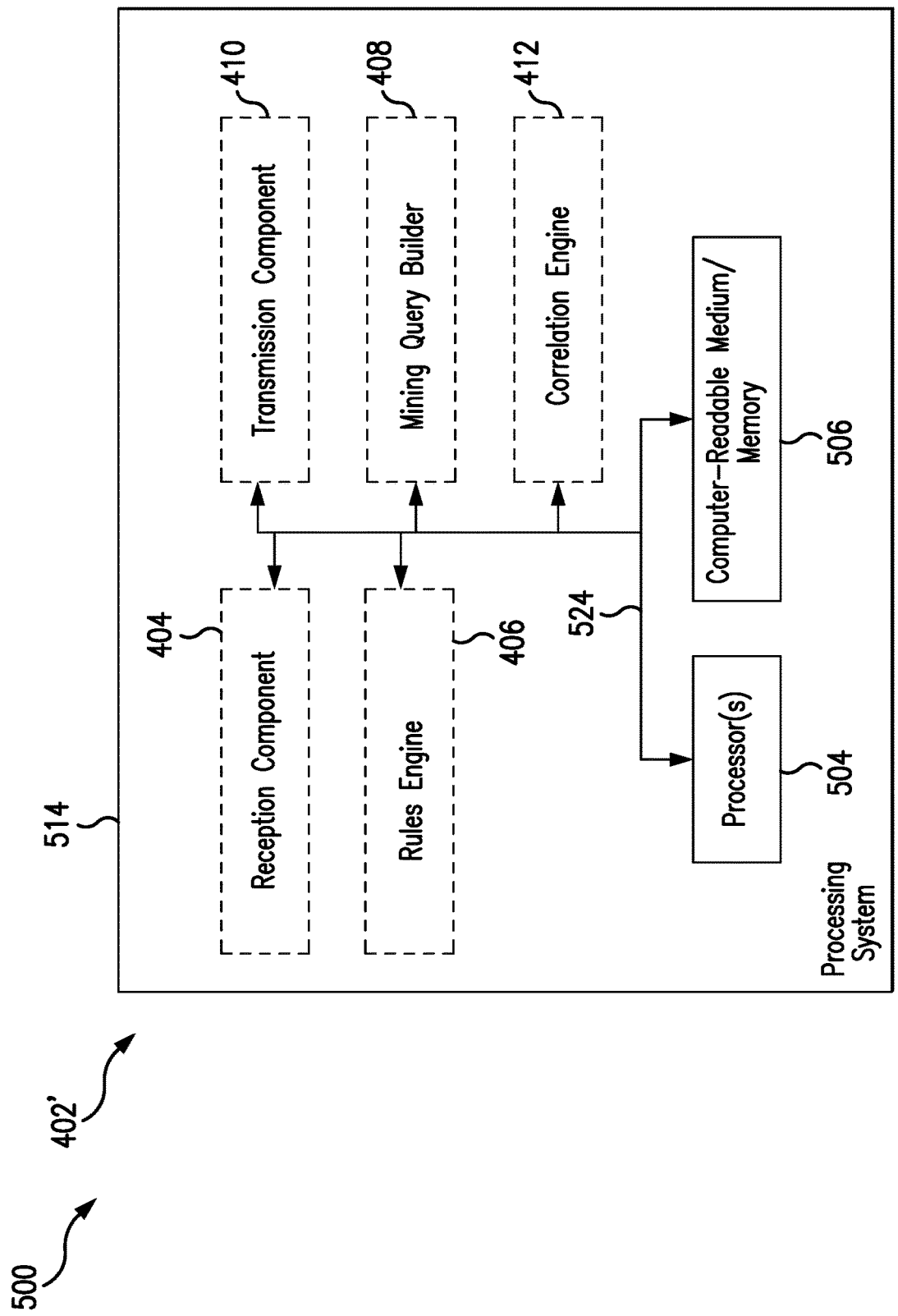
FIG. 5 is a diagram illustrating an example of a hardware implementation for an apparatus employing a processing system.

FIG. 5 is a diagram 500 illustrating an example of a hardware implementation for an apparatus 402' employing a processing system 514. The apparatus 402' may be the troubleshooting system 150 shown in FIG. 1. The processing system 514 may be implemented with a bus architecture, represented generally by a bus 524. The bus 524 may include any number of interconnecting buses and bridges depending on the specific application of the processing system 514 and the overall design constraints. The bus 524 links together various circuits including one or more processors and/or hardware components, represented by one or more processors 504, the reception component 404, the rules engine 406, the correlation engine 412, the mining query builder 408, the transmission component 410, and a computer-readable medium/memory 506. The bus 524 may also link various other circuits such as timing sources, peripherals, voltage regulators, and power management circuits, etc.

The processing system 514 includes one or more processors 504 coupled to a computer-readable medium/memory 506. The one or more processors 504 are responsible for general processing, including the execution of software stored on the computer-readable medium/memory 506. The software, when executed by the one or more processors 504, causes the processing system 514 to perform the various functions described supra for any particular apparatus. The computer-readable medium/memory 506 may also be used for storing data that is manipulated by the one or more processors 504 when executing software. The processing system 514 further includes at least one of the reception component 404, the rules engine 406, the correlation engine 412, the mining query builder 408 and the transmission component 410. The components may be software components running in the one or more processors 504, resident/stored in the computer readable medium/memory 506, one or more hardware components coupled to the one or more processors 504, or some combination thereof.

In one configuration, the apparatus 402/apparatus 402' includes means for performing each of the operations of FIG. 3. The aforementioned means may be one or more of the aforementioned components of the apparatus 402 and/or the processing system 514 of the apparatus 402' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for multi-protocol monitoring and correlation, the method comprising steps of:
   monitoring, via a network monitoring device, an exchange of network data;
   intercepting network data from the monitored network wherein the intercepted network data consists of captured user plane packets and control plane packets;
   aggregating captured network performance data from the captured user plane packets and control plane packets, comprising a plurality of captured network performance metrics for a plurality of subscriber session records associated with a plurality of protocols;
   performing a first level of correlation between the plurality of subscriber session records using one or more direct correlation rules, wherein the correlated subscriber session records associated with the plurality of protocols are related to a same subscriber session and wherein the first level of correlation is a shallow correlation whereby the protocols and child sessions are grouped and associated with the same subscriber session; and
   performing a second level of correlation between the correlated subscriber session records using one or more indirect correlation rules based on the performed first level of correlation and wherein the second level of correlation is a deep correlation whereby the child sessions are grouped and associated with the same subscriber session per each protocol.

2. The method of claim 1, wherein performing the second level of correlation further comprises correlating a first subscriber session record associated with a first protocol with a second subscriber session record associated with the first protocol using a third subscriber session record associated with a second protocol.

3. The method of claim 1, wherein performing the first level of correlation further comprises correlating a first subscriber session record associated with a first protocol with a second subscriber session record associated with a second protocol.

4. The method of claim 3, wherein the one or more direct correlation rules specifies a first attribute of the first protocol and a corresponding second attribute of the second protocol and wherein the first level of correlation is performed using the first attribute and the second attribute.

5. The method of claim 1, wherein the one or more direct correlation rules specifies a time period associated with the performed first level of correlation.

6. The method of claim 1, wherein the one or more indirect correlation rules specifies a time period associated with the performed second level of correlation.

7. The method of claim 1, wherein the one or more direct correlation rules and the one or more indirect correlation rules are expressed in a natural language.

8. A system for multi-protocol monitoring and correlation, the system comprising:
a processor and a memory device coupled to the processor, the memory device containing a set of instructions that, when executed by the processor, cause the processor to:
monitor, via a network monitoring device, an exchange of network data;
intercept network data from the monitored network wherein the intercepted network data consists of captured user plane packets and control plane packets;
aggregate captured network performance data from the captured user plane packets and control plane packets, comprising a plurality of captured network performance metrics for a plurality of subscriber session records associated with a plurality of protocols;
perform a first level of correlation between the plurality of subscriber session records using one or more direct correlation rules, wherein the correlated subscriber session records associated with the plurality of protocols are related to a same subscriber session and wherein the first level of correlation is a shallow correlation whereby the protocols and child sessions are grouped and associated with the same subscriber session; and
perform a second level of correlation between the correlated subscriber session records using one or more indirect correlation rules based on the performed first level of correlation and wherein the second level of correlation is a deep correlation whereby the child sessions are grouped and associated with the same subscriber session per each protocol.

9. The system of claim 8, wherein the set of instructions that, when executed by the processor, cause the processor to perform the second level of correlation further cause the processor to correlate a first subscriber session record associated with a first protocol with a second subscriber session record associated with the first protocol using a third subscriber session record associated with a second protocol.

10. The system of claim 8, wherein the set of instructions that, when executed by the processor, cause the processor to perform the first level of correlation further cause the processor to correlate a first subscriber session record associated with a first protocol with a second subscriber session record associated with a second protocol.

11. The system of claim 10, wherein the one or more direct correlation rules specifies a first attribute of the first protocol and a corresponding second attribute of the second protocol and wherein the first level of correlation is performed using the first attribute and the second attribute.

12. The system of claim 8, wherein the one or more direct correlation rules specifies a time period associated with the performed first level of correlation.

13. The system of claim 8, wherein the one or more indirect correlation rules specifies a time period associated with the performed second level of correlation.

14. The system of claim 8, wherein the one or more direct correlation rules and the one or more indirect correlation rules are expressed in a natural language.

15. A tangible, non-transitory, computer-readable media having software encoded thereon, the software, when executed by a processor, operable to:
monitor, via a network monitoring device, an exchange of network data;
intercept network data from the monitored network wherein the intercepted network data consists of captured user plane packets and control plane packets;
aggregate captured network performance data from the captured user plane packets and control plane packets, comprising a plurality of captured network performance metrics for a plurality of subscriber session records associated with a plurality of protocols;
perform a first level of correlation between the plurality of subscriber session records using one or more direct correlation rules, wherein the correlated subscriber session records associated with the plurality of protocols are related to a same subscriber session and wherein the first level of correlation is a shallow correlation whereby the protocols and child sessions are grouped and associated with the same subscriber session; and
perform a second level of correlation between the correlated subscriber session records using one or more indirect correlation rules based on the performed first level of correlation and wherein the second level of correlation is a deep correlation whereby the child sessions are grouped and associated with the same subscriber session per each protocol.

16. The computer-readable media of claim 15, wherein the software, when executed by the processor, operable to perform the second level of correlation is further operable to correlate a first subscriber session record associated with a first protocol with a second subscriber session record associated with the first protocol using a third subscriber session record associated with a second protocol.

17. The computer-readable media of claim 15, wherein the software, when executed by the processor, operable to perform the first level of correlation is further operable to correlate a first subscriber session record associated with a first protocol with a second subscriber session record associated with a second protocol.

18. The computer-readable media of claim 17, wherein the one or more direct correlation rules specifies a first attribute of the first protocol and a corresponding second attribute of the second protocol and wherein the first level of correlation is performed using the first attribute and the second attribute.

* * * * *